(12) United States Patent
Huang et al.

(10) Patent No.: US 7,310,171 B2
(45) Date of Patent: Dec. 18, 2007

(54) DOCUMENT SURFACE MICRO-ADJUST MECHANISM

(75) Inventors: Yin-Chun Huang, Hsinchu (TW); Shu-Ya Chiang, Taichung (TW)

(73) Assignee: Transpacific IP, Ltd., Taipei (TW)

( * ) Notice: Subject to any disclaimer, the term of this patent is extended or adjusted under 35 U.S.C. 154(b) by 984 days.

(21) Appl. No.: 10/063,055

(22) Filed: Mar. 15, 2002

(65) Prior Publication Data

US 2003/0174367 A1 Sep. 18, 2003

(51) Int. Cl.
*H04N 1/04* (2006.01)
(52) U.S. Cl. .................. 358/474; 358/474; 358/483; 358/471; 358/496
(58) Field of Classification Search .............. 358/475, 358/496, 474, 488, 482, 483, 471, 509, 505, 358/506, 512–514; 250/208.1, 234–236, 250/239, 216, 208.2; 382/312, 318, 319; 248/650, 478; 399/211, 367
See application file for complete search history.

(56) References Cited

U.S. PATENT DOCUMENTS

| | | | | |
|---|---|---|---|---|
| 5,838,540 A | * | 11/1998 | Wen-Shyong | 361/686 |
| 6,012,697 A | * | 1/2000 | Ohtomo et al. | 248/476 |
| 6,055,070 A | * | 4/2000 | Kang | 358/497 |
| 6,075,242 A | * | 6/2000 | Tsai et al. | 250/234 |
| 6,169,622 B1 | * | 1/2001 | Tsai et al. | 359/210 |
| 6,376,835 B1 | * | 4/2002 | Tsai | 250/234 |
| 6,450,475 B1 | * | 9/2002 | Tsai et al. | 248/650 |
| 6,640,082 B2 | * | 10/2003 | Mitomi | 399/374 |

FOREIGN PATENT DOCUMENTS

| | | | | |
|---|---|---|---|---|
| JP | 56072459 A | * | 6/1981 | |
| JP | 10285336 A | * | 10/1998 | |
| JP | 2001235814 A | * | 8/2001 | |

\* cited by examiner

*Primary Examiner*—Cheukfan Lee
(74) *Attorney, Agent, or Firm*—Stolowitz Ford Cowger LLP

(57) ABSTRACT

A document surface micro-adjust mechanism for an optical scanner. The optical scanner has an outer casing with a transparent document platform in the upper section. An optical lens is enclosed inside the outer casing. The document surface micro-adjust mechanism uses a carrier chassis to embed the transparent document platform. One end of the carrier chassis is hinged upon the upper wall of the outer casing while the other end of the carrier chassis has a through hole to be engaged to a locking hole on a latching structure attached to the upper section of the outer casing. A locking element passes through the through-hole to engage with the locking hole. An elastic element is positioned between the carrier chassis and the latching structure. Depth of the locking element inside the locking hole may be adjusted to vary optical distance from the document surface of the transparent document platform to the optical lens inside the scanner.

28 Claims, 5 Drawing Sheets

DOCUMENT SURFACE MICRO-ADJUST MECHANISM

BACKGROUND OF INVENTION

1. Field of Invention

The present invention relates to a document surface micro-adjust mechanism. More particularly, the present invention relates to a micro-adjust mechanism for adjusting the distance of separation between the document surface and the lens of an optical scanner.

2. Description of Related Art

Due to great advances in the functions of computers and the rapid proliferation of networking and multimedia communication, image patterns or documents are often directly captured by a digital camera or indirectly through an optical scanner and converted into digital data files. The images in the data files may be identified, edited or stored and later displayed through a computer monitor or other electronic product.

According to the manner in which document image is input, optical scanners may be classified into palm top scanners, paper feed scanners, drum scanners, and platform scanners. The palm top scanner operates by manually moving the scanner over the surface of a scan document horizontally. The paper feed scanner operates by putting a scan document at the entrance of a paper feeder. The paper feeder moves documents into the scanner one at a time so that scanning is performed at a stable and uniform speed. The platform scanner has a flat transparent panel for placing a scan document. An optical system underneath the flat transparent panel moves so that the scan document is scanned one section at a time. Note that since a platform scanner is capable of scanning a B5 size document or bigger, a rather large total trace (TT) is required to project the image of a large document onto a sensor having a smaller width.

Following progressive maturity of manufacturing technique for optical scanners, different types of optical scanners are developed to deal with different types of documents. To scan a card or a picture, there is no need to have an optical scanner with a large total trace (TT). In general, to scan a small document, an optical scanner often employs a roller to drive the document forward while an optical system scans the moving document. This type of scanner occupies a smaller space. A scanner of this type is referred to as a card scanner if cards are the main scanning items and a photo scanner if photographs are the main scanning items.

FIG. 1 is a schematic cross-sectional view of a conventional small document optical scanner. As shown in FIG. 1, the scanner 100 comprises a casing 110, a transparent document platform 112, a roller 120, a light source 130, a group of reflecting mirrors 140, an optical lens 150 and a sensor 160. A document 10 driven by the roller 120 is fed onto the document surface 114 of the transparent document platform 112. The document picks up light from the light source 130 and reflects a portion of the light back along an optical path 20. The light reflects repeatedly through the group of reflecting mirrors 140 to enter the optical lens 150. The optical lens 150 focuses and projects the light onto the optical sensor 160. On receiving the light, the optical sensor 160 converts the image pattern on the document 10 into digital output signals.

After all the components of the optical scanner 100 are assembled together, minor adjustment is often made through the optical lens 150 along the optical path 20. The optical lens is moved so that light reflected from the document 10 is focused precisely on the sensor 160. FIG. 2 is a schematic diagram showing minor adjustment of the optical lens to focus an image on a sensor. Note that the document surface 114 and the sensor 160 (image surface) are fixed relative to each other. Only the optical lens is shifted to bring the light from the document 10 at the document surface 114 exactly in focus on the sensor 160. The optical lens is fixed in position after adjustment.

SUMMARY OF INVENTION

Accordingly, one object of the present invention is to provide a document surface micro-adjust mechanism for an optical scanner. In particular, this invention provides an optical scanner having a shorter total trace (TT). The document surface on an optical document platform can be micro-adjusted so that distance along the optical path from the document surface to an optical lens within the optical scanner is slightly increased or decreased to bring a document image exactly in focus on an optical sensor.

To achieve these and other advantages and in accordance with the purpose of the invention, as embodied and broadly described herein, the invention provides a document surface micro-adjust mechanism for an optical scanner. The optical scanner includes an outer casing, a transparent document platform and an optical lens. The transparent document platform is located in the upper portion of the outer casing. The transparent document platform has a document surface. The optical lens is installed inside the outer casing. The document surface micro-adjust mechanism at least includes a carrier chassis having a first side terminal and a second side terminal. The first side terminal of the carrier chassis is hinged to an upper sidewall of the outer casing. The second side terminal of the carrier chassis has a through hole. The transparent document platform is embedded within the carrier chassis. The document surface of the transparent document platform can move slightly to adjust the optical path within the scanner. The document surface micro-adjust mechanism further includes a locking mechanism mounted on the outer casing. The locking mechanism has a locking hole that corresponds in position to the through hole in the carrier chassis. The document surface micro-adjust mechanism also includes a locking element that passes through the through hole and engages with the locking hole of the locking mechanism. Depth of the locking element within the locking hole corresponds to the required distance along the optical path from the document surface on the transparent document platform to the optical lens. The document surface micro-adjust mechanism also employs at least one elastic element between the carrier chassis and the latching structure. One end of the elastic element pushes against the carrier chassis while the other end of the elastic element pushes against the latching structure. Furthermore, the locking element sequentially passes through the through hole and the elastic element before engaging with the locking hole on the latching structure.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
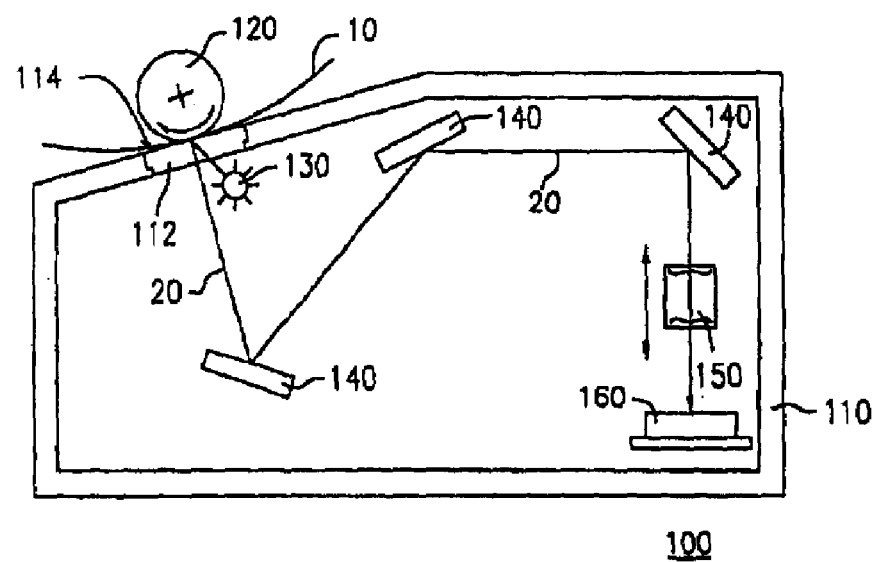
FIG. 1 is a schematic cross-sectional view of a conventional small document optical scanner.
Figure 2:
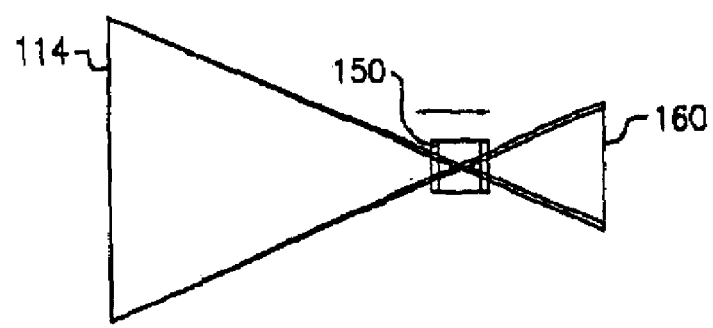
FIG. 2 is a schematic diagram showing minor adjustment of the optical lens to focus an image on a sensor.

Reference will now be made in detail to the present preferred embodiments of the invention, examples of which are illustrated in the accompanying drawings. Wherever possible, the same reference numbers are used in the drawings and the description to refer to the same or like parts.

This invention provides a document surface micro-adjust mechanism suitable for manually adjusting the distance from the document surface of an optical lens within the scanner after the scanner is assembled together so that the image is in better focus.

Figure 3:
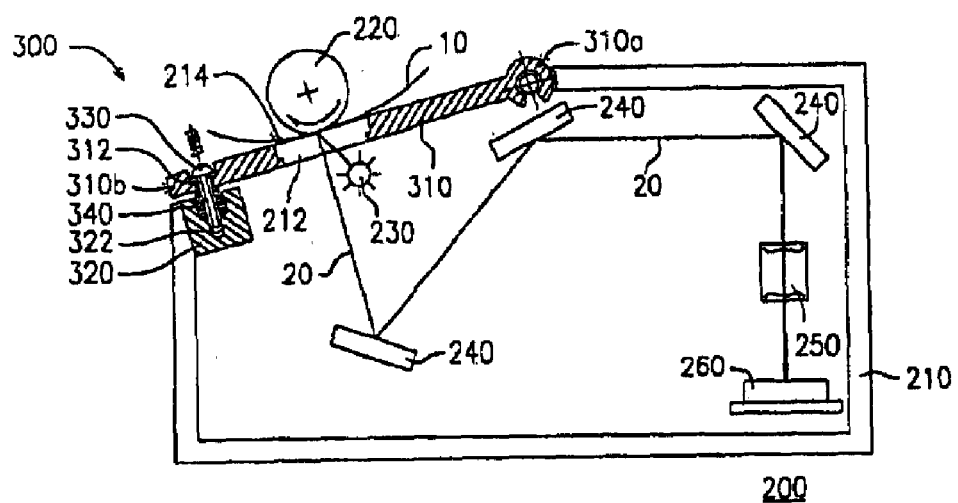
FIG. 3 is a schematic cross-sectional view of a document surface micro-adjust mechanism of an optical scanner according to this invention.

FIG. 3 is a schematic cross-sectional view of a document surface micro-adjust mechanism on an optical scanner according to this invention. As shown in FIG. 3, the optical scanner 200 (for example, a card scanner or a photo scanner) mainly comprises an outer casing 210, a transparent document platform 212, a roller 220, a light source 230, a group of reflecting mirrors 240, an optical lens 250 and a sensor 260. A document 10 is driven by the roller 220 to move onto a document surface 214 within the transparent document platform 212. The document 10 picks up light from the light source 230 and deflects the light along an optical path 20. Each mirror in the mirror group 240 deflects light along the optical path 20 before finally entering the optical lens 250. The optical lens 250 focuses and projects the light onto the optical sensor 260. The optical sensor converts the light pattern obtained from the document 10 into electrical output signals.

The document surface micro-adjust mechanism 300 comprises of a carrier chassis 310 having a first side terminal 310a and a second side terminal 310b. The first side terminal 310a is hinged to an upper sidewall of the outer casing 210. For example, an axial hinge may be used to link up with the upper sidewall of the outer casing 210. The second side terminal 310b of the carrier chassis 310 has a through hole 312. The transparent document platform 212 is embedded within the carrier chassis 310. Hence, the document surface 214 within the transparent document platform 212 is able to increase or decrease the optical path slightly by finely adjusting the carrier chassis relative to the scanner 200.

The document surface micro-adjust mechanism 300 further includes a latching structure 320 mounted on the outer casing 210. The latching structure 320 is formed, for example, as an integrative unit on the upper wall or sidewall of the outer casing 210. The latching structure 320 has a locking hole 322 that corresponds in position to the through hole 312 on the carrier chassis 310. The document surface micro-adjust mechanism 300 further includes a locking element 330 such as a screw fastener. The locking element 330 passes through the through hole 312 and engages with the locking hole 322. Depth of the locking element 330 inside the locking hole 322 corresponds to the distance of the optical path 20 between the document surface 214 of the transparent document platform 212 and the optical lens 250. The document surface micro-adjust mechanism 300 further includes an elastic element 340 such as a spring or a coiled spring structure. The elastic element 340 is inserted between the carrier chassis 310 and the latching structure 320. One end of the elastic element 340 pushes against the carrier chassis 310 while the other end of the elastic element 340 pushes against the latching structure 320. If the locking element 330 is a screw and the elastic element 340 is a coiled spring, the locking element 330 passes through the through hole 312 and the elastic element 340 to engage the locking hole 322 in the latching structure 320.

Since the first side terminal 310a of the carrier chassis 310 is attached to the upper wall of the outer casing 210, the carrier chassis 310 may rotate through a hinge at the first side terminal 310a. The transparent document platform 212 embedded on the carrier chassis 310 also moves when the carrier chassis 310 rotates. Because the carrier chassis 310 translates only a tiny amount (1~2 mm) compared with distance along the optical path 20, translation perpendicular to the optical path 20 may be neglected. Hence, distance from the document surface 214 to the optical lens 250 may be adjusted by varying the depth of engagement of the locking element 330 inside the locking hole 322.

Figure 4:
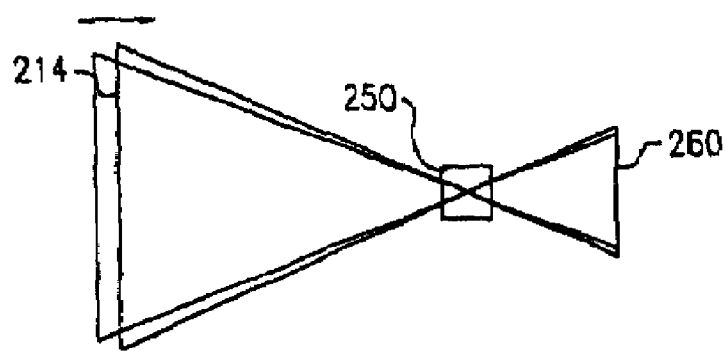
FIG. 4 is a schematic diagram showing minor adjustment of the optical lens to focus an image on a sensor using the document surface micro-adjust mechanism according to this invention.

After assembling all the components (including the document surface micro-adjust mechanism 300) together to form the optical scanner 200, scanning properties of the optical scanner 200 are tested. One major test is the resolution on the optical sensor 260. FIG. 4 is a schematic diagram showing minor adjustment of the optical lens to focus an image on a sensor using the document surface micro-adjust mechanism according to this invention. As shown in FIG. 4, distance (object length) from the document surface 214 to the optical lens 250 may be adjusted so that light on the surface of the document 10 is focused clearly on the optical sensor 260. Furthermore, after manual adjustment, locking glue may be injected into the through hole 312 and around the latching structure 320, the locking element 330, and the elastic element 340, to fix the final adjustment. Once the locking glue is applied, shift in position of the document surface 214 due to transport or vibration is prevented.

Figure 5A:
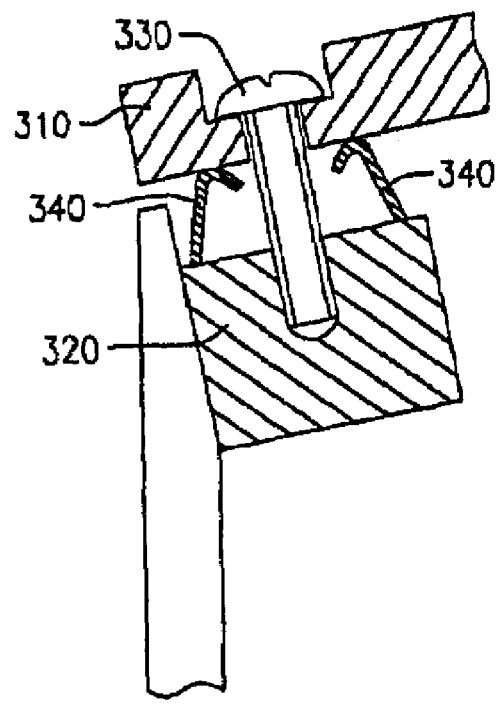
FIGS. 5A and 5B are schematic diagrams showing two configurations of the elastic element deployed by the document surface micro-adjust mechanism according to this invention.
Figure 5B:
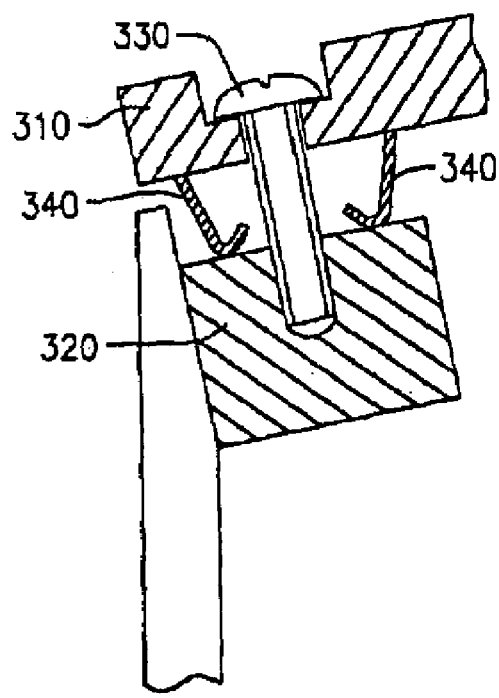

FIGS. 5A and 5B are schematic diagrams showing two configurations of the elastic element deployed by the document surface micro-adjust mechanism according to this invention. In FIG. 5A, the elastic element 340 is not a coiled spring (as shown in FIG. 3). Since the latching structure 320 is made from plastic material, the elastic element 340 and the latching structure 320 may be formed together as an integrative unit. Similarly, in FIG. 5B, the elastic element 340 and the carrier chassis 310 may be formed together as an integrative unit. Both configurations eliminate the demand for the insertion of a coiled spring.

In conclusion, the document surface micro-adjust mechanism of this invention utilizes the attachment of a transparent document platform to a carrier chassis that hinges onto an outer casing. Through rotary movement of the carrier chassis, the document surface of the transparent document platform may shift by a small amount so that the optical distance (object length) between the document surface and the optical lens can be minutely adjusted. After manual adjustment of the object length, a positioning glue or material may be applied to the components of the document surface micro-adjust mechanism. Hence, relative position of the carrier chassis, the latching mechanism, the locking element and the elastic element are fixed. Thus, positional shift during transport or vibration is avoided.

The document surface micro-adjust mechanism of this invention is applied to an optical scanner. Through the adjustment of total trace distance (object length) between the document surface and the optical lens, magnification of a document may be affected. However, for an optical scanner having a shorter total trace (TT), sensitivity to the adjustment of object length is lower. Consequently, the document surface micro-adjust mechanism of this invention is best suited to an optical scanner having a short total trace, in particular, a portable optical scanner.

Note that because object length to the optical lens is adjusted before assembling the outer casing, the document surface may deviate from the desired distance to the optical lens. In this invention, the optical distance (object length) between the document surface and the optical lens is adjusted only after the entire assembling process of the optical scanner is complete. In addition, fixing glue is applied to lock up various components of the document surface micro-adjust mechanism. Hence, the desired position for forming a high-resolution image on the sensor is maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A micro-adjust apparatus for adjusting an optical path of an optical scanner, the micro-adjust apparatus comprising:
   a carrier chassis disposed at an outer casing of said optical scanner, wherein the carrier chassis comprises a document platform and a through-hole;
   an engaging component at the outer casing; and
   an adjusting component disposed at least partially through the through-hole to engage with the engaging component, wherein the adjusting component is adapted to adjust a position of the carrier chassis with respect to an optical lens of said optical scanner.

2. The micro-adjust apparatus of claim 1, wherein the carrier chassis further includes a first side and a second side, wherein the first side is hinged to the outer casing.

3. The micro-adjust apparatus of claim 1, wherein the engaging component is formed to be integrated with the outer casing.

4. The micro-adjust apparatus of claim 1, further comprising an elastic component coupled to the carrier chassis to push against the outer casing.

5. The micro-adjust apparatus of claim 4, wherein the elastic component comprises a spring.

6. The micro-adjust apparatus of claim 1, wherein the adjusting component comprises a screw.

7. The micro-adjust apparatus of claim 1, wherein the engaging component comprises a threaded hole.

8. The micro-adjust apparatus of claim 1, wherein the adjusting component comprises a bolt.

9. The micro-adjust apparatus of claim 1, wherein the the document platform is substantially formed from transparent material.

10. An apparatus, comprising:
    one or more optical devices to transmit light representing one or more scanned objects in an optical path, said one or more optical devices being disposed within an outer casing;
    a carrier chassis pivotably coupled to the outer casing, wherein the carrier chassis comprises a document platform; and
    an adjusting component disposed on the carrier chassis and adapted to adjust a position of the carrier chassis with respect to said outer casing to change said optical path.

11. The apparatus of claim 10, further comprising a through-hole in the carrier chassis adapted to receive said adjusting component.

12. The apparatus of claim 10, further comprising an engaging component formed on the outer casing adapted to engage said adjusting component.

13. The apparatus of claim 12, wherein the adjusting component comprises a screw.

14. The apparatus of claim 13, wherein the engaging component comprises a threaded hole adapted to receive at least a portion of the screw.

15. The apparatus of claim 10, wherein the carrier chassis further comprises a first side and a second side, wherein at least one of the first and second sides is hinged to the outer casing.

16. The apparatus of claim 15 further comprising an axial hinge to hinge the outer casing to at least one of the first and second sides.

17. The apparatus of claim 10, further comprising an elastic component positioned at the carrier chassis to push against the outer casing.

18. The apparatus of claim 17, wherein the elastic component comprises a spring.

19. The apparatus of claim 10, wherein the document platform is formed substantially from transparent material.

20. The apparatus of claim 10 wherein the carrier chassis further comprises a first side and a second side, wherein at least one of the first and second sides is pivotably coupled to the outer casing.

21. A system comprising:
    an optical device casing having a latching structure;
    a light source disposed in the casing;
    an optical lens disposed in the casing;
    a document platform coupled to the optical device casing and having a through-hole; and
    an adjusting component positioned at least partially in the through-hole to engage with the latching structure for adjusting a position of the document platform with respect to the optical device casing.

22. The system of claim 21, wherein the document platform further includes a first side and a second side, wherein the first side is hinged to the casing.

23. The system of claim 21, further comprising an elastic component positioned at the casing to push against the document platform.

24. The system of claim 23, wherein the latching structure and the elastic component comprise an integrated unit.

25. The system of claim 23, wherein the elastic component comprises a spring.

26. The system of claim 21, wherein the adjusting component comprises a screw.

27. The system of claim 21, wherein the latching structure comprises a threaded hole.

28. The system of claim 21, wherein the optical device casing comprises a scanner casing.

* * * * *

UNITED STATES PATENT AND TRADEMARK OFFICE
CERTIFICATE OF CORRECTION

PATENT NO. : 7,310,171 B2  Page 1 of 1
APPLICATION NO. : 10/063055
DATED : December 18, 2007
INVENTOR(S) : Huang et al.

It is certified that error appears in the above-identified patent and that said Letters Patent is hereby corrected as shown below:

At column 5, line 60, please replace "wherein the the" with --wherein the--.

Signed and Sealed this

Thirteenth Day of July, 2010

David J. Kappos
*Director of the United States Patent and Trademark Office*